United States Patent
Collins et al.

[11] Patent Number: 6,157,815
[45] Date of Patent: Dec. 5, 2000

[54] METHOD AND APPARATUS FOR PROVIDING BROADCAST MESSAGES IN A COMMUNICATIONS NETWORK

[75] Inventors: David Noel Collins, Encinitas; Paul Thatcher Williamson, San Diego; Edward G. Tiedemann, Jr., San Diego; Frank Quick, San Diego, all of Calif.

[73] Assignee: Qualcomm Incorporated, San Diego, Calif.

[21] Appl. No.: 08/912,049

[22] Filed: Aug. 15, 1997

Related U.S. Application Data

[63] Continuation of application No. 08/316,157, Sep. 30, 1994, abandoned.

[51] Int. Cl.[7] ....................................................... H04Q 7/08
[52] U.S. Cl. ........................ 455/38.1; 455/228; 455/517; 340/825.44
[58] Field of Search ................................. 455/38.1, 38.2, 455/38.3, 228, 343, 517, 31.2, 31.3; 340/825.44, 825.47, 825.03, 825.04

[56] References Cited

U.S. PATENT DOCUMENTS

| | | | |
|---|---|---|---|
| 4,845,491 | 7/1989 | Fascenda | 340/825.47 X |
| 5,301,225 | 4/1994 | Suzuki et al. | 379/59 |
| 5,382,949 | 1/1995 | Mock et al. | 455/38.3 X |
| 5,398,021 | 3/1995 | Moore | 340/825.44 X |
| 5,450,071 | 9/1995 | DeLuca et al. | 340/825.47 X |
| 5,481,254 | 1/1996 | Gaskill et al. | 455/38.1 X |
| 5,537,097 | 7/1996 | Ericksson et al. | 455/38.3 X |

FOREIGN PATENT DOCUMENTS

| | | | |
|---|---|---|---|
| 0428126 | 5/1991 | European Pat. Off. | H04Q 7/04 |
| 2244409 | 11/1991 | United Kingdom | H04Q 7/04 |
| 9318596 | 3/1993 | WIPO | H04J 3/16 |
| 9409599 | 10/1993 | WIPO | H04Q 7/04 |

*Primary Examiner*—Fan Tsang
*Assistant Examiner*—Philip J. Sobutka
*Attorney, Agent, or Firm*—Philip R. Wadsworth; Roger W. Martin; Thomas R. Rouse

[57] ABSTRACT

The present invention is a novel and improved method for providing broadcast short message services (SMS) in a communication network. It is an objective of the present invention to provide a method and apparatus that insures the successful transmission of the broadcast message while minimizing the impact of providing the short messaging service on overall system capacity. It is further the objective of the present invention to provide a method and apparatus for receiving broadcast messages without depriving the receiver of the benefits of slotted paging, that being the savings in power consumption.

25 Claims, 4 Drawing Sheets

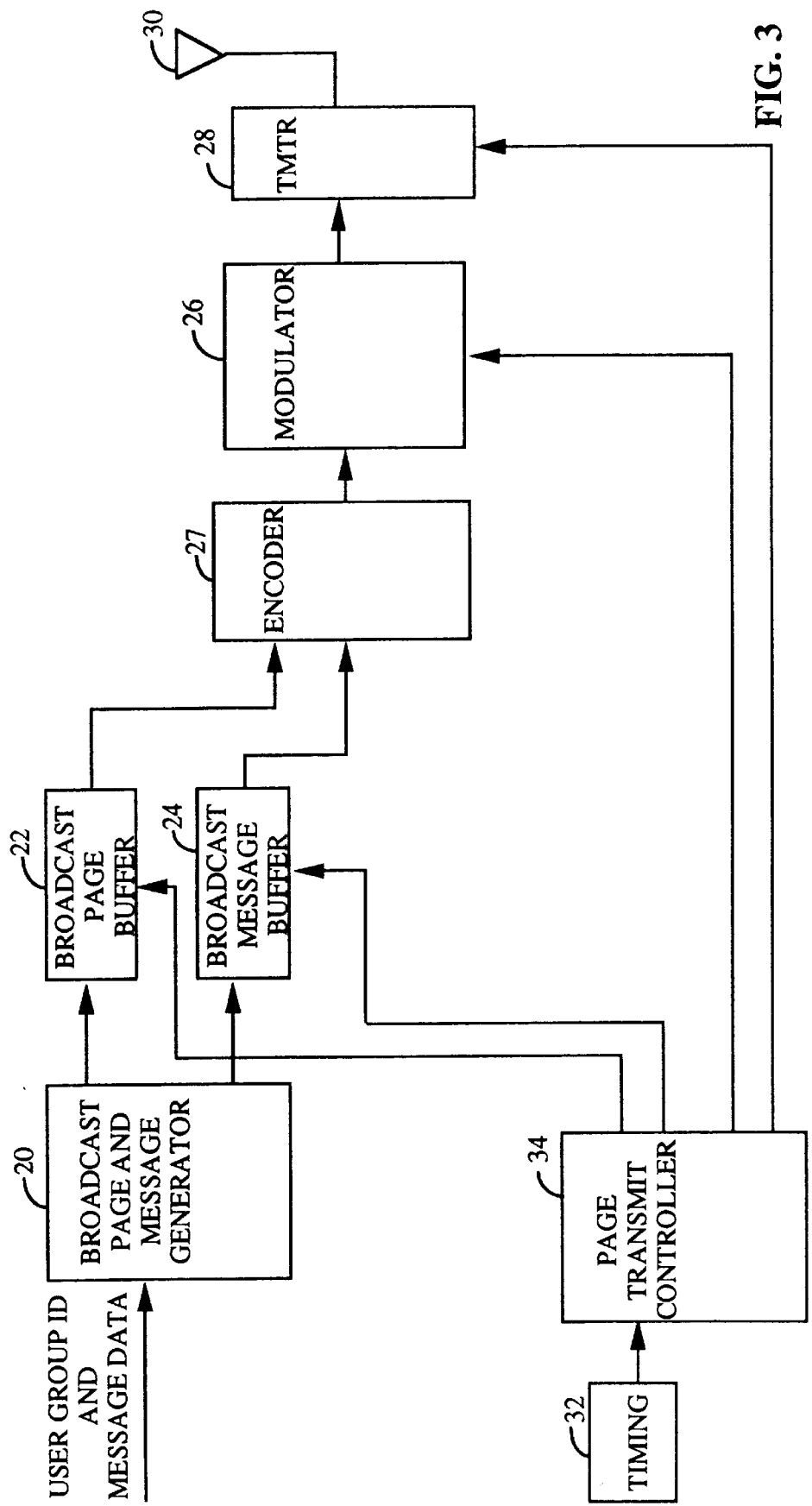

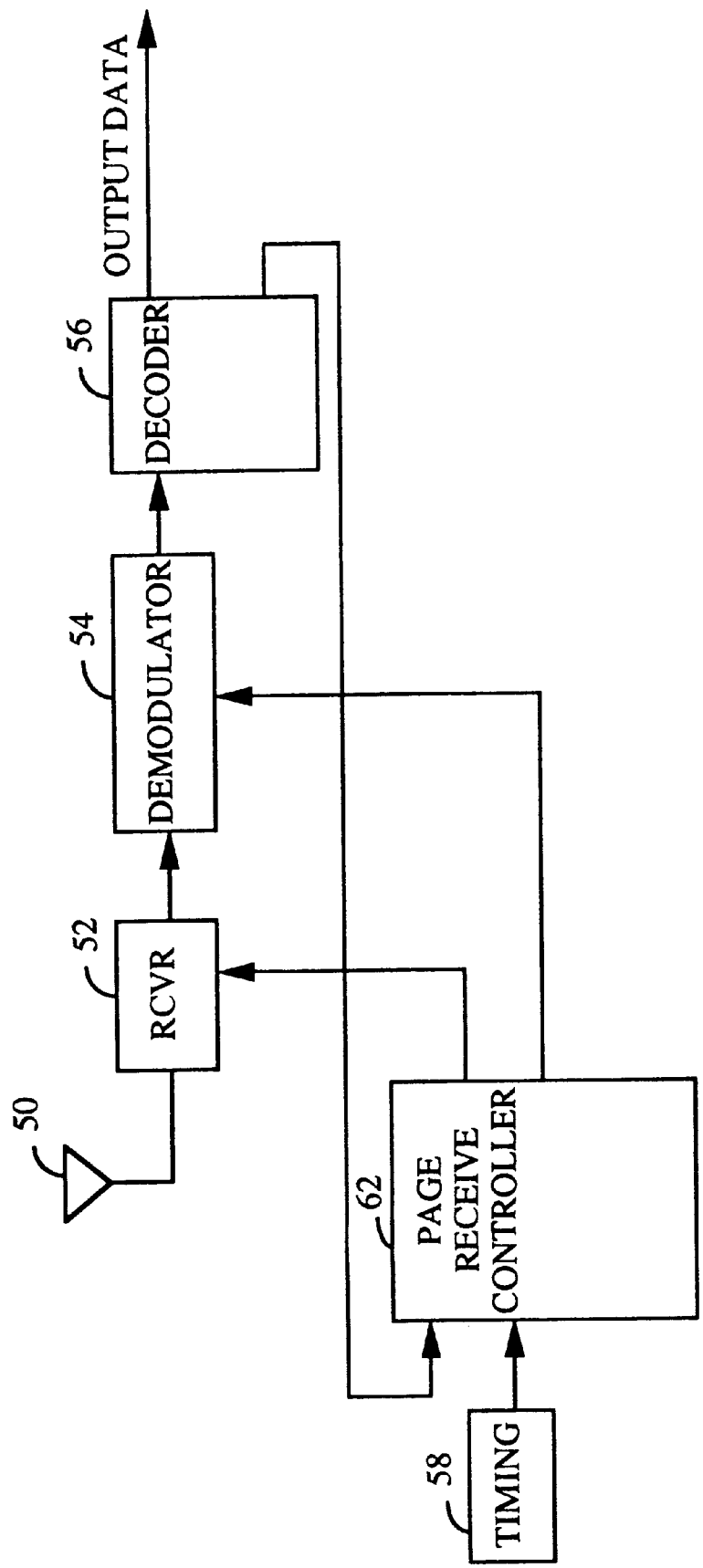

METHOD AND APPARATUS FOR PROVIDING BROADCAST MESSAGES IN A COMMUNICATIONS NETWORK

This is a Continuation of application Ser. No. 08/316,157 filed Sep. 30, 1994 now abandoned.

BACKGROUND OF THE INVENTION

I. Field of the Invention

The present invention relates to communications. More particularly, the present invention relates to a novel and improved method and apparatus for providing broadcast short message services.

II. Description of the Related Art

In communication systems, a central communications center transmits data to remote subscriber stations. In order to efficiently use a limited communications resource, the communications resource is divided into sub-bands and channels. A typical allocation of channels would include a pilot channel, a synchronization channel providing necessary timing information, a plurality of traffic channels for conducting point to point communications and a plurality of paging channels associated with the traffic channels for providing signaling data.

Typically, when a subscriber station registers with the central communications center, the central communications center informs the subscriber station which paging channel of the plurality of available paging channels to monitor. When the central communications center needs to set up a point to point communication with a subscriber station it transmits a traffic page on the paging channel being monitored by the subscriber station. The traffic page would typically comprise subscriber station identification information and traffic channel identification information. In response to the received traffic page, the identified subscriber station would prepare to conduct point to point communications on the identified traffic channel.

Power consumption is an important consideration of the subscriber stations, particularly in the case of mobile subscriber stations. In order to reduce the power consumption of the subscriber stations, a method known as slotted paging was devised. Slotted paging in a spread spectrum communications system is described in detail in copending U.S. Pat. No. 5,392,287, assigned to assignee of the present invention and incorporated by reference herein. By this technique a subscriber station monitors its assigned paging channel at predetermined intervals, which results in a significant power savings relative to monitoring the paging channel continuously.

The central communications center must know a priori the time slots when the subscriber station will monitor the paging channel, and must reserve all pages for that subscriber station for these slots. When the paging channel is monitored at intervals, the system is referred to as slotted paging, whereas when the paging channel is continuously monitored it is referred to as non-slotted paging. The periods when the subscriber station is not monitoring the paging channel can vary from subscriber station to subscriber station depending on the needs of the subscriber station user.

The expression slotted paging comes from dividing time into slots of a predetermined duration. In a slotted paging system, the subscriber station monitors a slot, it will again monitor a subsequent slot an integral number slots in the future. The number of slots between periodically monitored slots is referred to as the slot cycle.

In addition, it is possible to send very short messages over the paging channel to subscriber stations. It is, however, important to keep the length of such messages to a minimum because the paging channel resource is a shared resource and by its nature scarce.

In the communications industry there is a need to be able to transmit broadcast messages. Broadcast messages are messages that are provided to all users in a local area. For example a weather service, may provide weather forecasts to all the subscriber stations in a given area. The use of slotted paging provides a challenge to providing broadcast message in such a way that they can be received by all of the subscriber stations in the area.

SUMMARY OF THE INVENTION

The present invention is a novel and improved method for providing broadcast short message services (SMS) in a communication network. It is an objective of the present invention to provide a method and apparatus that insures the successful transmission of the broadcast message while minimizing the impact of providing the short messaging service on overall system capacity. It is further the objective of the present invention to provide a method and apparatus for receiving broadcast messages without depriving the receiver of the benefit of reduced power consumption gained by slotted paging.

It is an advantage of the present invention that it is capable of successfully providing a broadcast short message service in communication systems that provide for slotted paging and it is an advantage of the present invention that it is capable of operation in communication systems that support any number of paging channels.

In a first embodiment of the present invention, a broadcast message is provided on every paging channel and in every slot in a predetermined maximum slot cycle. This message reaches all subscriber stations regardless of its individual slot cycle or assigned paging channel. This message contains a header that provides the subscriber station with information upon which to discriminate between broadcast messages the subscriber station wishes to receive and broadcast messages the subscriber station does not wish to receive.

In a second embodiment, a broadcast page is provided on every paging channel and in every slot in a predetermined maximum slot cycle. The broadcast page advertises a forthcoming broadcast message to all subscriber stations. The corresponding broadcast message is provided once on all paging channels and if the subscriber station wishes to receive the broadcast message it monitors the paging channel at the appropriate time. The broadcast page may either explicitly indicate a single slot position in which the corresponding broadcast message will be provided or the slot position in which the corresponding broadcast message will be provided may be determined in accordance with a deterministic algorithm.

The third embodiment of the present invention provides for periodic broadcast paging on all paging channels. In the third embodiment, all broadcast pages are provided in one or more slots in a periodic cycle. The period of the broadcast paging slots is referred to as the broadcast cycle. As described above, the broadcast page may either explicitly indicate a single slot position in which the corresponding broadcast message will be provided or the slot position in which the corresponding broadcast message will be provided may be calculated using a predetermined convention. If the subscriber station wishes to receive broadcast messages it must monitor its assigned paging channel during the broadcast page slot and then the subscriber station must monitor the paging channel during the appropriate broadcast message slot in order to receive the corresponding broadcast message.

The fourth embodiment of the present invention provides for single channel periodic broadcast paging. In the fourth embodiment, broadcast pages are provided periodically on a single designated paging channel. If a subscriber station wishes to receive broadcast messages, it tunes to the designated paging channel at the appropriate time to receive the broadcast pages. If the subscriber station wishes to receive any of the corresponding broadcast messages, the subscriber station tunes to the broadcast message paging channel at the appropriate broadcast message slot to receive the broadcast message. The broadcast message paging channel can be provided explicitly in the broadcast page or determined in accordance with a predetermined convention.

In a preferred embodiment, the broadcast pages and broadcast messages are provided redundantly with a temporal relationship to one another such that all subscriber stations are able to receive a broadcast page and its corresponding broadcast message. A method for determining the optimal temporal relationship is described in detail herein.

The fifth embodiment operates in conjunction with the periodic broadcast paging methods described previously. In the fifth embodiment, a new page indicator is provided on every slot on every paging channel. This new page indicator indicates to the subscriber station whether any new broadcast pages will be provided in the periodic broadcast page slot saving the subscriber station from monitoring the broadcast page slot when there are no new broadcast messages.

The sixth embodiment of the present invention operates in conjunction with methods in which broadcast pages advertise forthcoming broadcast messages. In the exemplary embodiment, the broadcast page provides a delivery vector which indicates how the corresponding broadcast message is to be received. In the exemplary embodiment, the delivery vector selectively specifies a frequency sub-band, a channel and a time slot in which a corresponding broadcast message is to be provided. Furthermore, the broadcast page contains a broadcast handle that specifies the nature of the corresponding broadcast message. This broadcast message may contain information as to the source of the message, the function of the message, the language in which the message is provided and a sequence number. The broadcast handle provides sufficient information to allow the subscriber station to determine whether or not to receive the related broadcast message. In particular, the sequence number allows the subscriber station to ignore duplicates thus providing a power savings by avoiding the reception of broadcast messages already received.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is a block diagram of the transmission system of the present invention; and FIG. 4 is a block diagram of the receiving system of the present invention.

DETAILED DESCRIPTION OF THE PREFERRED EMBODIMENTS

Figure 1:
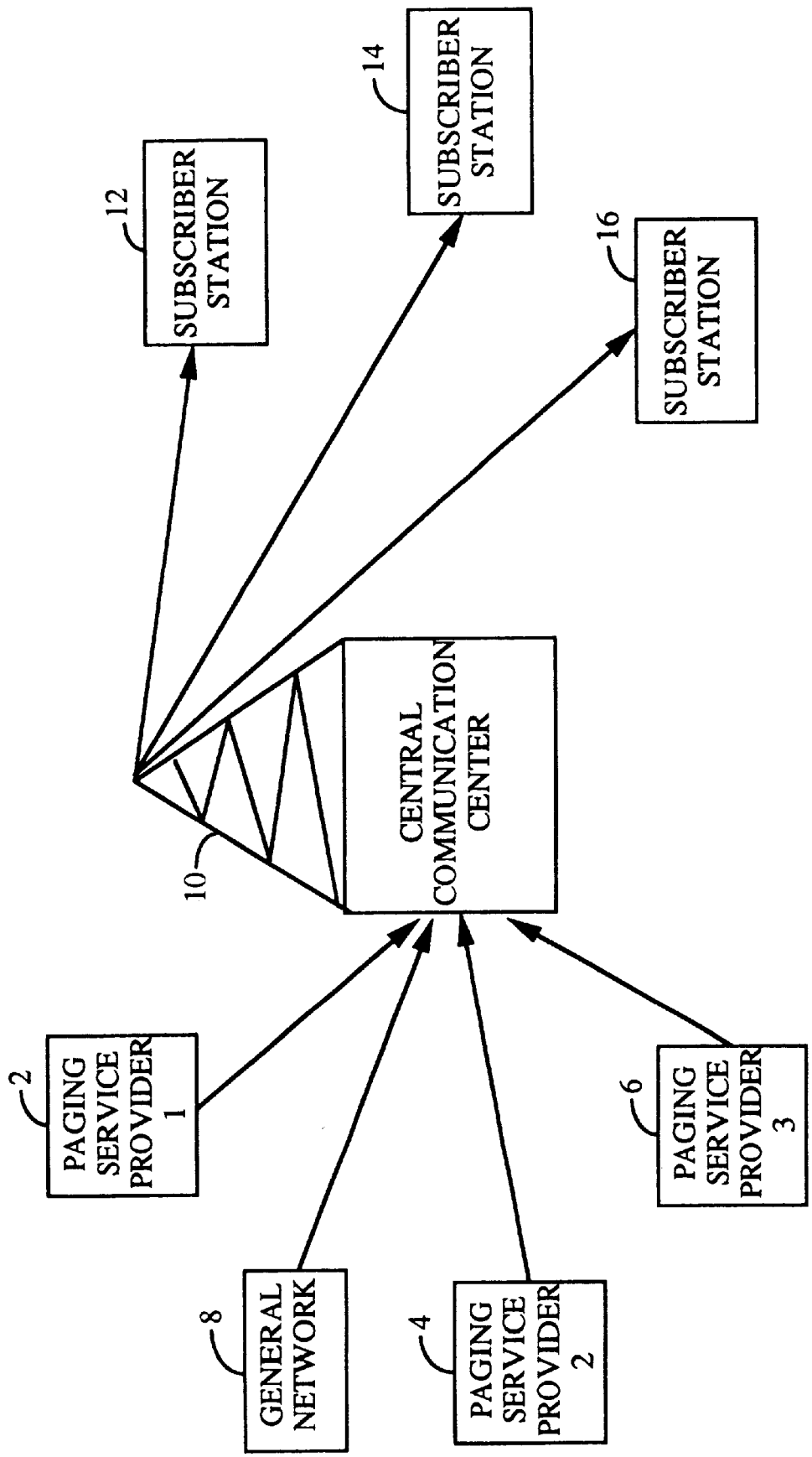
FIG. 1 is an illustration of the environment of the present invention.

Referring now to FIG. 1, paging service providers 2, 4 and 6 provide messages to central communications center 10. The messages contain a header indicating the nature of the message and the actual message to be broadcast to the subscriber stations in the area. The broadcast messages are then broadcast by central communication center 10 to subscriber stations 12, 14 and 16. Subscriber stations 12, 14 and 16 receive the broadcast messages and selectively provide the messages to the subscriber station user. In the exemplary embodiment, the signals are transmitted by the central communication center 10 to subscriber stations 12, 14 and 16 in accordance with a CDMA communication format as detailed in the U.S. Pat. Nos. 4,901,307 and 5,103,459, both assigned to the assignee of the present invention.

Paging service providers 2, 4 and 6 may be commercial or governmental services that provide broadcast messages to users in the local area. A typical example of paging service providers include services that provide stock quote or weather information. Broadcast messages may also be provided by private parties through general network 8. A typical example of this would be the case where an employer wishes to provide a short message to its employees in the area.

Figure 2:
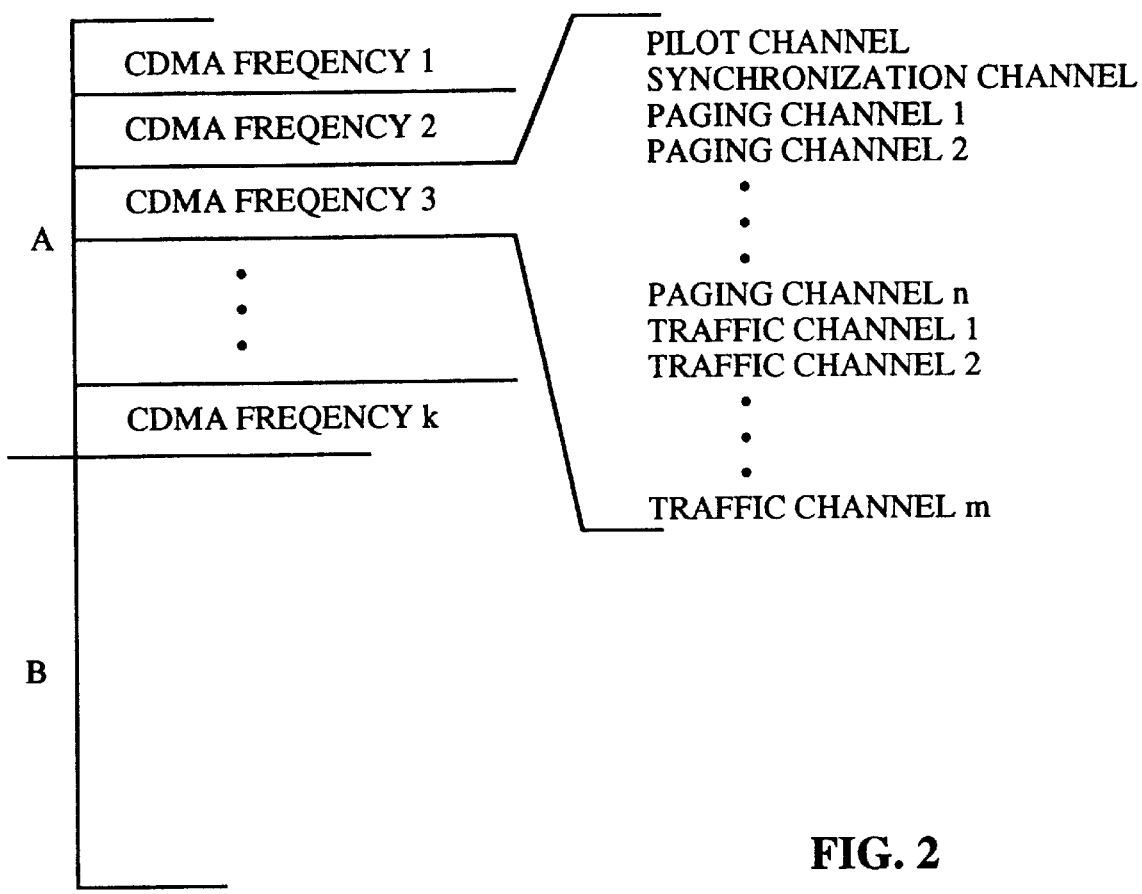
FIG. 2 is an illustration of a division of a communication resource in the exemplary embodiment of a spread spectrum multiple access communication system.

FIG. 2 illustrates the exemplary method of dividing a communications resource, namely an allocated frequency band. In the exemplary embodiment, the spectrum is divided into bands with the different bands being used by different service providers. For example, the spectrum may be divided into two halves as illustrated in FIG. 2, with a first half of the spectrum being used by carrier A and the second half being used by carrier B.

A carrier may then divide its portion of the overall spectrum into usable sub-bands. In FIG. 2, carrier A has divided its band of the spectrum into k separate sub-bands. In the exemplary embodiment, each of these sub-bands is then subdivided into channels, which are designated according to their use. In FIG. 2, CDMA FREQUENCY 3 is illustrated as being subdivided into a pilot channel, a synchronization channel, m traffic channels and n paging channels. It may be noted that it is not necessary for each sub-band to contain all of the channels illustrated. In the exemplary embodiment of a CDMA communication system, the channels are separated from one another in code space.

The traffic channels are used for point to point communications of data and are allocated to an individual user for the duration of the point to point service being provided. The paging channels are a set of commonly shared channels used by the all of the subscriber stations for receiving signaling and short message data. An example of signalling data is a traffic page instructing a subscriber station that point to point communications are to be conducted and upon which traffic channel they are to be conducted. The use of paging channels is described in detail the aforementioned copending U.S. Pat. No. 5,392,287.

When a communication system uses a plurality of paging channels, each user is assigned a paging channel on which to receive pages. A subscriber station monitors its assigned paging channel for traffic pages. In a non-slotted paging communication system the subscriber station continuously monitors its assigned paging channel for pages. However, because constant monitoring entails excessive energy expenditure, slotted paging communication systems were developed and are described in detail in the aforementioned copending U.S. Pat. No. 5,392,287.

In a slotted paging system, the subscriber station "wakes up" or "powers up" at predetermined time intervals, referred to as slot cycles, to monitor its assigned paging channel for traffic pages. The central communications center knows the times at which the subscriber station will be monitoring its assigned paging channel and in accordance with this knowledge provides pages at such times that they may be received.

Different subscriber stations may monitor their assigned paging channels at different slot cycles. In addition, in order to maximize system capacity, slotted paging systems distribute the slots in which different subscriber stations receive pages as uniformly as possible over a predetermined maximum slot cycle. The maximum slot cycle refers to the number of slots within which all subscriber stations must monitor their assigned paging channels for incoming traffic pages. The varying slot cycles and the distribution of monitored slots over the maximum slot cycle pose challenges to broadcast paging, because it is rarely the case when all the users in the area are simultaneously monitoring any one paging channel.

The first embodiment of the present invention provides the broadcast message on every paging channel and in every slot in the maximum slot cycle.

Referring now to FIG. 3, a message to be broadcast comprising a message and a header indicating the nature of the message is provided to broadcast page and message generator 20. Broadcast page and message generator 20 generates a broadcast message in accordance with a predetermined broadcast format.

The broadcast message is provided to broadcast message buffer 24. In response to timing signals from page transmit controller 34, broadcast message buffer 24 provides the broadcast message to encoder 27. Page transmit controller 34 in accordance with a clock signal from timing element 32 provides timing signals such that the broadcast message is provided redundantly in every slot in the maximum slot cycle.

Encoder 27 encodes the broadcast message for the purposes of error detection/correction or privacy. The encoded broadcast message is provided by encoder 27 to modulator 26.

Modulator 26 modulates the encoded broadcast message on each paging channel in accordance with signals from page transmit controller 34.

In the exemplary embodiment, modulator 26 is a code division multiple access (CDMA) modulator, as detailed in the aforementioned U.S. Pat. Nos. 4,901,307 and 5,103,459. The modulated broadcast message data is provide to transmitter (TMTR) 28, which upconverts and amplifies the signal so as to provide the broadcast message data on all subbands in accordance with a signal from page transmit controller 34. The amplified and upconverted signal is provided to antenna 30 and broadcast to all subscriber stations in the area.

FIG. 4 illustrates the exemplary receiving system of the present invention. The signal transmitted from antenna 30 is received at antenna 50 and provided to receiver (RCVR) 52, where it is downconverted and amplified. Page receive controller 62 in accordance with a clock signal from timing element 58 determines the appropriate slot times for the receiving system to monitor its assigned paging channel. In this first exemplary embodiment, the receiving system monitors its assigned paging channel once per slot cycle for traffic pages and broadcast messages.

At the appropriate slot time page receive controller 62 provides a timing signal to receiver 52 that causes the receiver to become active and monitor its assigned paging channel. The received signal is provided to demodulator 54, where it is demodulated. In the exemplary embodiment, demodulator 54 is a CDMA demodulator as described in detail in U.S. Pat. Nos. 4,901,307 and 5,103,459. Demodulator 54 provides the demodulated signal to decoder 56. Decoder 56 decodes the demodulated signal and selectively provides the broadcast message to the subscriber station user.

In a second exemplary embodiment of the present invention, a broadcast page giving notice of a forthcoming broadcast message is provided in every slot on every paging channel. The corresponding broadcast message is provided in one slot on every paging channel. The temporal relationship between the broadcast page and its corresponding broadcast message may be explicitly provided in the broadcast page or it may be determined in accordance with a deterministic algorithm.

Referring to FIG. 3, a message to be broadcast comprising a message and a header indicating the nature of the message is provided to broadcast page and message generator 20. Broadcast page and message generator 20 generates a broadcast message and broadcast page in accordance with a predetermined broadcast format, for example a hashing algorithm.

In an exemplary hashing algorithm, assume that each broadcast page contains a broadcast handle that provides the subscriber station with information with which to determine the nature of the broadcast message. Then assume that there is a function H that maps the space of all broadcast handles to a uniform distribution into the range $0 \leq H(\text{handle}) < N$, where N is value determined to provide an acceptable distribution of the broadcast messages on the paging channel. If the broadcast page is provided in slot $b_{page}$, then the corresponding message will be provided in slot $b_{msg}$ given by the value:

$$b_{msg} = b_0 + H(\text{handle}), \quad (1)$$

where $b_0$ is a fixed offset following the slot in which the last of the broadcast pages for the broadcast message, $b_{msg}$, occurs. In cases where the broadcast page is only provided once, $b_0$ is the slot in which the single broadcast page is provided.

In a preferred hashing algorithm, the central communications center is provided with a means for deconflicting two messages that hash to the same slot. In the preferred hashing algorithm the broadcast page is delineated into two separate sub-fields, one is referred to as the sequence number, i, and the other is referred to as the identifier, x. If the broadcast page is provided in slot $b_{page}$, then the corresponding message will provided in slot $b_{msg}$ given by the value:

$$b_{msg} = b_0 + (H(x) + i) \bmod B, \quad (2)$$

where $b_0$ is a fixed offset following the slot in which the last of the broadcast page for the broadcast message, $b_{msg}$, occurs, H(x) maps the space of all identifiers to the range of $0 \leq H(x) < N$ and B is the broadcast cycle. In general the sequence numbers for two broadcast messages provided in the same broadcast cycle will be the same. However, in the case that two broadcast messages hash to the same slot number, the central communications center can deconflict the broadcast messages by changing the sequence number, i, of one of the messages.

The broadcast message is provided to broadcast message buffer 24 and the broadcast page is provided to broadcast page buffer 22. Page transmit controller 34 provides timing signals to broadcast page buffer 22 such that the broadcast page is provided in each slot in the maximum slot cycle. In response to the timing signals from page transmit controller 34, broadcast page buffer 22 provides the broadcast pages to encoder 27. Encoder 27 encodes the broadcast pages and provides the encoded broadcast pages to modulator 26. Modulator 26 modulates the encoded broadcast pages such that the broadcast pages are provided on every paging channel in accordance with signals from page transmit controller 34.

The modulated broadcast pages are provided by modulator 26 to transmitter (TMTR) 28, which upconverts and amplifies the signal so as to provide the broadcast pages on all paging channels in accordance with a signal from page transmit controller 34. The amplified and upconverted broadcast page signal is provided to antenna 30 and broadcast to all subscriber stations in the local area.

After the broadcast pages for the entire maximum slot cycle have been transmitted, page transmit controller 34 provides a timing signal at the appropriate broadcast message slot time to message buffer 24. Message buffer 24 provides the broadcast message to encoder 27 in accordance with the timing signal. Encoder 27 encodes the broadcast message and provides the encoded broadcast message to modulator 26.

Modulator 26 modulates the encoded broadcast message on each paging channel in accordance with signals from page transmit controller 34. The modulated broadcast message is provided by modulator 26 to transmitter (TMTR) 28, which upconverts and amplifies the message so as to provide the broadcast message on all paging channels in accordance with a signal from page transmit controller 34. The amplified and upconverted broadcast message is provided to antenna 30 and broadcast to all subscriber stations in the local area.

Referring to FIG. 4, page receive controller 62 provides a slot timing signal to receiver 52 that causes receiver 52 to monitor its assigned paging channel. The broadcast page is provided through antenna 50 to receiver 52 where it is downconverted and amplified. The received broadcast page is provided to demodulator 54, where it is demodulated and provided to decoder 56.

Decoder 56 decodes the broadcast page and provides the decoded broadcast page to page receive controller 62. Page receive controller 62 determines in accordance with a predetermined set of user preferences if the forthcoming broadcast message will be of interest to the subscriber station user.

If page receive controller 62 determines that the forthcoming broadcast message will be of interest to the subscriber station user, then it generates signals to receive the broadcast message. Page receive controller 62 determines the slot in which the broadcast message will be provided. The slot containing the broadcast message may be extracted from the broadcast page or determined in accordance with a deterministic algorithm.

Page receive controller 62 provides a slot timing signal to receiver 52 that cause the receiver to monitor the paging channel at the time appropriate for receiving the broadcast message. Receiver 52 receives the broadcast message provided through antenna 50 and downconverts and amplifies the received broadcast message. The received broadcast message is then provided to demodulator 54 which demodulates the received broadcast message. The demodulated broadcast message is provided to decoder 56 which decodes the broadcast message and provides the broadcast message to the subscriber station user.

In a third exemplary embodiment, broadcast pages are provided periodically in a designated slot on all paging channels. As described previously, the broadcast pages provide information about forthcoming broadcast messages.

The corresponding broadcast messages are provided at least once on every paging channel. The period at which the broadcast pages are provided is referred to as the broadcast cycle. If a subscriber station is to receive broadcast messages it must monitor its assigned paging channel during the slot times in which broadcast pages are provided.

Referring to FIG. 3, a message to be broadcast comprising a message and a header indicating the nature of the message is provided to broadcast page and message generator 20. Broadcast page and message generator 20 generates a broadcast message and broadcast page in accordance with a predetermined broadcast format.

The broadcast message is provided to broadcast message buffer 24 and the broadcast page is provided to broadcast page buffer 22. Page transmit controller 34 provides a timing signal to broadcast page buffer 22 to provide the broadcast page in the appropriate broadcast page slot. In response to the timing signal from page transmit controller 34, broadcast page buffer 22 provides the broadcast page to encoder 27. Encoder 27 encodes the broadcast page and provides the encoded broadcast page to modulator 26.

Modulator 26 modulates the encoded broadcast page so as to provide the broadcast page on each paging channel in accordance with signals from page transmit controller 34. The modulated broadcast page is provided by modulator 26 to transmitter (TMTR) 28, which upconverts and amplifies the broadcast page signal so as to provide the broadcast page on all paging channels in accordance with a signal from page transmit controller 34. The amplified and upconverted broadcast page signal is provided to antenna 30 and broadcast to all subscriber stations in the local area.

In the transmission of the corresponding broadcast message, page transmit controller 34 provides a timing signal to broadcast message buffer 22 indicating the appropriate slot in which to provide the broadcast message. In response, broadcast message buffer 22 provides the broadcast message to encoder 27. Encoder 27 encodes the broadcast message and provides the encoded broadcast message to modulator 26.

Modulator 26 modulates the encoded broadcast message on each paging channel in accordance with signals from page transmit controller 34. The modulated broadcast message is provided by modulator 26 to transmitter (TMTR) 28, which upconverts and amplifies the broadcast message to provide the broadcast message on all paging channels in accordance with a signal from page transmit controller 34. The amplified and upconverted broadcast message signal is provided to antenna 30 and broadcast to all subscriber stations in the local area.

Referring to FIG. 4, page receive controller 62 provides a slot timing signal to receiver 52 that causes receiver 52 to monitor its assigned paging channel during the broadcast page slot. The received broadcast page is provided to demodulator 54, where it is demodulated and provided to decoder 56. Decoder 56 decodes the broadcast page signal and provides the decoded broadcast page to page receive controller 62. Page receive controller 62 determines in accordance with a set of user preferences if the corresponding broadcast message will be of interest to the subscriber station user.

If page receive controller 62 determines that the forthcoming broadcast message is of interest to the subscriber station user, then it generates signals to receive the corresponding broadcast message. Page receive controller 62 determines the slot in which the broadcast message will be provided. As described previously, the slot containing the broadcast message may be extracted from the broadcast page or determined by a deterministic algorithm.

Page receive controller 62 provides a slot timing signal to receiver 52 that causes receiver 52 to monitor its paging channel at the time appropriate for receiving the broadcast message. Receiver 52 receives the broadcast message provided through antenna 50 and downconverts and amplifies the received broadcast message and provides the signal to demodulator 54. Demodulator 54 demodulates the received broadcast message and provides the demodulated broadcast message to decoder 56 which decodes the broadcast message and provides the broadcast message to the subscriber station user.

In the fourth embodiment of the present invention, broadcast pages are provided periodically on a single designated paging channel. In the exemplary embodiment, the corresponding broadcast messages are provided on the same designated paging channel. If a subscriber station is to receive broadcast messages, it must tune to the designated paging channel at the appropriate slot time to receive the broadcast pages.

If the subscriber station wishes to receive a corresponding broadcast message it must tune to and monitor the designated paging channel at the appropriate broadcast message slot time. As described previously, the temporal relationship between the broadcast page and corresponding broadcast message may be explicitly provided in the broadcast page or it may be determined by a deterministic relationship.

Referring to FIG. 3, a message to be broadcast comprising a message and a header indicating the nature of the message is provided to broadcast page and message generator 20. Broadcast page and message generator 20 generates a broadcast message and broadcast page in accordance with a predetermined broadcast format.

The broadcast message is provided to broadcast message buffer 24 and the broadcast page is provided to broadcast page buffer 22. Page transmit controller 34 provides a timing signal to provide the broadcast page in the appropriate slot. In response to the timing signal from page transmit controller 34, broadcast page buffer 22 provides the broadcast page to encoder 27. Encoder 27 encodes the broadcast page and provides the encoded broadcast page to modulator 26.

Modulator 26 provides the encoded broadcast page on the designated paging channel in accordance with a signal from page transmit controller 34. The modulated broadcast page is provided by modulator 26 to transmitter (TMTR) 28, which upconverts and amplifies the broadcast page signal so as to provide the broadcast page on the designated paging channel in accordance with a signal from page transmit controller 34. The amplified and upconverted broadcast page signal is provided to antenna 30 and broadcast to all subscriber stations in the local area.

In the transmission of the corresponding broadcast message, page transmit controller 34 provides a timing signal to broadcast message buffer 22 indicating the appropriate slot in which to provide the broadcast message. Broadcast message buffer 22 provides the broadcast message to encoder 27. Encoder 27 encodes the broadcast message and provides the encoded broadcast message to modulator 26.

Modulator 26 modulates the encoded broadcast message on the designated paging channel in accordance with signals from page transmit controller 34. The modulated broadcast message is provided by modulator 26 to transmitter (TMTR) 28, which upconverts and amplifies the signal to provide the broadcast message on the designated paging channel in accordance with a signal from page transmit controller 34. The amplified and upconverted broadcast message signal is provided to antenna 30 and broadcast to all subscriber stations in the local area.

Referring to FIG. 4, page receive controller 62 provides a slot timing signal to receiver 52 that causes receiver 52 to tune to and monitor the designated paging channel during the broadcast page slot. The broadcast page is received through antenna 50 and downconverted and amplified by receiver 52. Receiver 52 provides the broadcast page to demodulator 54, where it is demodulated and provided to decoder 56. Decoder 56 decodes the broadcast page and provides the decoded broadcast page to page receive controller 62. Page receive controller 62 determines in accordance with a set of user preferences if the corresponding broadcast message is of interest to the subscriber station user.

If page receive controller 62 determines that the forthcoming broadcast message is of interest to the subscriber station user, then it generates signals to receive the corresponding broadcast message. Page receive controller 62 determines the slot in which the broadcast message will be provided.

Page receive controller 62 provides a slot timing signal to receiver 52 that causes receiver 52 to tune to and monitor the designated paging channel at the broadcast message slot time. Receiver 52 receives the broadcast message provided through antenna 50 and downconverts and amplifies the received broadcast-message. Demodulator 54 demodulates the received broadcast message and provides the demodulated broadcast message to decoder 56 which decodes the broadcast message and provides the broadcast message to the subscriber station user.

In a preferred embodiment of the fourth embodiment, the broadcast page and broadcast message data are each provided twice in order to insure that two consecutive broadcast paging slots or any two consecutive transmissions of a broadcast message do not both coincide with the traffic paging slots of any subscriber station. Subscriber stations in the system may be assigned a slot cycle of a specified period, $S_n$. Each subscriber station is able to choose its slot cycle from a range of slot cycles, $S_1, S_2, \ldots$. For an arbitrary subscriber unit, x, having a traffic slot cycle of $S_n$, its paging slots, $s_n$, will occur according to:

$$s_n = (n*S_n) + F(x), \tag{3}$$

where $F(x)$ uniformly maps a subscriber's unique station identifier to the range $0 \leq F(x) < S_n$.

The system may also specify a broadcast paging slot cycle having period B where at least one slot of every broadcast cycle is used to transmit broadcast pages. In such a system, it may be desirable to choose broadcast paging slots in such a way that no two consecutive broadcast paging slots both coincide with the traffic paging slot of an arbitrary subscriber. This can be done by choosing consecutive paging slots such that the distance between them, in slots, is not evenly divisible by any traffic slot cycle $S_n$ that is available to subscriber stations.

In the exemplary embodiment, subscriber stations are able to choose from a set of traffic paging cycles having period as specified by:

$$S_n = 2^n * 16, (0 \leq n \leq 7) \tag{4}$$

Let the broadcast paging cycle period for all subscriber stations be specified by:

$$B = 2^m * 16, (0 \leq m \leq 7) \tag{5}$$

Let $b_k$ represent a slot number relative to the beginning of broadcast cycle k. Then let succeeding broadcast page slots be defined by the following recurrence relation.

$$b_k = (b_{k-1} + i) \bmod B. \quad (6)$$

Note that any value of i, $1 \leq i \leq 15$ will produce broadcast paging slots having the desired property of non-coincidence with traffic paging slots. However, in a variation on the embodiment mentioned above, subscriber stations may actually monitor the slot immediately preceding and immediately following their assigned slots, thus restricting the value of i such that $2 \leq i \leq 14$. Also note that it may be desirable to pick a value of i such that the distance between two broadcast pages, both of which may coincide with the traffic paging slot of some subscriber unit, is maximized. A value of i=3 has this property and is the value selected for the exemplary embodiment. In fact, any value of i which is less than and relatively prime to the least common factor of B and $S_n$ has this property. To insure that two consecutive pages $P_k$ and $P_{k+1}$ do not both coincide with the traffic slots of an arbitrary subscriber station, the difference $(P_{k+1} - P_k)$ must not be divisible by $S_n$.

In a first method to deconflict traffic and broadcast slots, a first broadcast page is transmitted advertising two forthcoming broadcast messages, then a second broadcast page is transmitted advertising the same two forthcoming broadcast messages. If as described above the two broadcast pages are separated by a broadcast cycle plus a number of slots that is less than and relatively prime to the least common factor of B and $S_n$, then all subscriber stations can receive one or the other of the two broadcast pages.

If in addition the two redundantly provided broadcast messages are similarly separated by a broadcast cycle plus a number of slots that is less than and relatively prime to the least common factor of B and $S_n$, then all subscriber stations can receive one or the other of the two broadcast messages. The positions of the broadcast messages can be provided explicitly in the broadcast pages or the number of slots between the second broadcast page and the first corresponding broadcast message can be determined in accordance with the hashing algorithms described previously. It should be noted that providing more than one broadcast page or message in a given broadcast cycle may result in an unacceptable distribution, which can be fixed by the additional offset of a broadcast cycle provided between any of the broadcast pages or messages.

In a second method to deconflict traffic and broadcast slots, a first broadcast page is transmitted advertising a forthcoming broadcast message, then a second broadcast page is transmitted advertising the same forthcoming duplicate broadcast message. In this method the two broadcast pages are separated by a broadcast cycle plus a number of slots that is less than and relatively prime to the least common factor of B and $S_n$. The relationship between the broadcast page and its corresponding broadcast message must be equal to an integral multiple of the least common multiple of the possible slot cycles.

The fifth exemplary embodiment operates in conjunction with any of the methods described previously for periodic broadcast paging. In the fifth embodiment, the transmission system provides a new page indicator in each slot in a maximum slot cycle and on every paging channel. When a subscriber station monitors its paging channel for traffic pages, it can determine from the new page indicator if it needs to monitor for new broadcast pages. This can result in a power savings for the subscriber station, in that it will not unnecessarily monitor for incoming broadcast pages. This exemplary embodiment operates in conjunction with the second third or fourth exemplary embodiments.

In the exemplary embodiment, the broadcast page consists essentially of two fields. The first field referred to as the broadcast handle is used by the subscriber station to discriminate between those messages that it wishes to receive and those that it does not. The second field is referred to as the delivery vector and as described previously tells the subscriber station to which channel and sub-band to tune and in which slot to receive the corresponding broadcast message.

The broadcast handle consists optionally of four sub-fields. The sub-fields include source address, function code, sequence number and language indicator. The source address identifies the sender of the message. he function code indicates the subject matter of the message. The sequence number identifies the version of the message, so that in the case where the broadcast page is provided redundantly, the subscriber station will be able to avoid receiving the same message twice. The language indicator indicates the language in which the message is provided (i.e. English, Spanish, French, etc.). It is not necessary for each sub-field to be uniquely specified as long as the aggregate broadcast handle is uniquely specified. It is, also, not necessary to provide information in all of the sub-fields.

The delivery vector consists of three sub-fields which in the exemplary embodiment included frequency band, channel and slot sub-fields. The frequency band sub-field specifies the frequency sub-band in which the corresponding broadcast message will be provided. The channel sub-field specifies the paging or traffic channel where the corresponding broadcast message will be provided. The slot sub-field specifies the slot number within the specified sub-band and channel where the broadcast messages will be provided. As described previously any or all of the delivery vector sub-fields can be provided explicitly or determined in accordance with a predetermined calculation format.

It may be desirable to provide paging using a combination of the abovementioned techniques. For example it may be desirable to employ a more efficient broadcast paging method in general situations, but to provide an explicit page on all slots in a broadcast cycle in the event of an emergency message.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for receiving broadcast messages from a transmitter in a communication network, said network having multiple paging channels, wherein each of said multiple paging channels is divided into predetermined slot cycles, wherein each of said predetermined slot cycles is divided into time slots, said network further containing multiple receivers, wherein each of said multiple receivers monitors an assigned paging channel of said multiple paging channels and an assigned time slot within each slot cycle, said apparatus comprising:

page receive controller means for providing a timing signal indicative of said assigned time slot within each of said slot cycles;

receiver means for monitoring said assigned paging channel in a single time slot of said slot cycle in accordance with said timing signal and for receiving said broadcast message during said single time slot; and decoder means for decoding said broadcast message and for selectively processing said broadcast message in accordance with a predetermined set of user preferences.

2. An apparatus for transmitting broadcast messages to a plurality of receivers in a communication network, said network having multiple paging channels, wherein each of said multiple paging channels is divided into predetermined slot cycles, wherein each of said predetermined slot cycles is divided into time slots, said network further containing multiple receivers, wherein each of said multiple receivers monitors an assigned one of said multiple paging channels at a first assigned one of said time slots within a first slot cycle for receiving traffic pages and a second one of said time slots within said first slot cycle, said second one of said time slots designated as a broadcast page time slot, and wherein said broadcast message is received on said assigned one of said paging channels at a third time slot within a second slot cycle, said apparatus comprising:

page transmit controller means for providing a page timing signal indicative of said broadcast page time slot within said first slot cycle and for providing a broadcast message timing signal indicative of said third time slot within said second slot cycle;

broadcast page buffer means for providing a broadcast page in accordance with said page timing signal;

message buffer means for providing said broadcast message in accordance with said broadcast message timing signal;

modulator means for providing said broadcast page on each of said multiple paging channels and for providing said broadcast message on each of said multiple paging channels; and transmitter means for transmitting said broadcast page and said broadcast message.

3. The apparatus of claim 2 wherein:

said page transmit controller means is further for providing a new page timing signal indicative of a new page indicator in each time slot of said first slot cycle, wherein said new page indicator indicates whether or not a new broadcast page is available to be received;

said broadcast page buffer means is further for providing said new page indicator in accordance with said new page timing signal;

said modulator means is further for providing said new page indicator upon each of said multiple paging channels; and said transmitter means is further for transmitting said new page indicator.

4. An apparatus for receiving broadcast messages from a transmitter in a communication network, said network having multiple paging channels, wherein each of said multiple paging channels is divided into predetermined slot cycles, wherein each of said predetermined slot cycles is divided into time slots, said network further containing multiple receivers, wherein each of said multiple receivers monitors an assigned one of said multiple paging channels at a first assigned one of said time slots within a first slot cycle for receiving traffic pages and a second one of said time slots within said first slot cycle, said second one of said time slots designated as a broadcast page time slot, and wherein said broadcast message is received on said assigned one of said paging channels at a third time slot within a second slot cycle, said apparatus comprising:

page receive controller means for providing a page timing signal indicative of said broadcast page time slot within each slot cycle and for determining in which time slot a broadcast message may be received;

receiver means for monitoring said assigned one of said multiple paging channels in accordance with said page timing signal and for receiving a broadcast page, wherein said broadcast page specifies said third time slot within said second slot cycle;

decoder means for decoding said broadcast page and for providing said decoded broadcast page to said page receive controller, wherein said page receive controller is further for determining in accordance with a predetermined set of user preferences, whether to receive said broadcast message;

broadcast message controller means for providing a broadcast message timing signal indicative of said third time slot within said second slot cycle; and broadcast message receiver means for receiving said broadcast message in accordance with said broadcast message timing signal.

5. The apparatus of claim 4 wherein:

said page receive controller means is further for providing a new page timing signal indicative of a new page indicator at said first assigned one of said time slots in each slot cycle, wherein said new page indicator indicates whether or not a new broadcast page is available to be received;

said receiving means is further for receiving said new page indicator; and said decoder means is further for preventing said receiver means from monitoring said one of said assigned paging channels for said broadcast page if said new page indicator indicates that no broadcast page is available to be received.

6. An apparatus for transmitting broadcast messages to a plurality of receivers in a communications network, said network having multiple paging channels, wherein each of said multiple paging channels is divided into predetermined slot cycles, wherein each of said predetermined slot cycles is divided into time slots, said network further containing multiple receivers, wherein each of said multiple receivers monitors an assigned one of said multiple paging channels at a first assigned one of said time slots within a first slot cycle for receiving traffic pages and a second paging channel, designated as a broadcast message paging channel where broadcast pages and said broadcast messages are transmitted on, at a second one of said time slots within a second slot cycle, and wherein said broadcast message is received on said broadcast message paging channel at a third time slot within said second slot cycle, said apparatus comprising:

page transmit controller means for providing a page timing signal indicative of said second time slot within said second slot cycle and for providing a broadcast message timing signal indicative of said third time slot within said second slot cycle;

broadcast page buffer means for providing a broadcast page in accordance with said page timing signal, wherein said broadcast page specifies said third time slot within said second slot cycle;

broadcast message buffer means for providing said broadcast message in accordance with said broadcast message timing signal;

modulator means for providing said broadcast page upon said broadcast message paging channel and for providing said broadcast message on said broadcast message paging channel; and transmitter means for transmitting said broadcast page and said broadcast message.

7. The apparatus of claim 6 wherein:

said page transmit controller means is further for providing a new page timing signal indicative of a new page indicator in each time slot of said first slot cycle, and wherein said new page indicator indicates whether or not a new broadcast page is available to be received;

said broadcast page buffer means is further for providing said new page indicator in accordance with said new page timing signal;

said modulator means is further for providing said new page indicator upon each of said multiple paging channels; and said transmitter means is further for transmitting said new page indicator.

8. An apparatus for receiving broadcast messages from a transmitter in a communications network, said network having multiple paging channels, wherein each of said multiple paging channels is divided into predetermined slot cycles, wherein each of said predetermined slot cycles is divided into time slots, said network further containing multiple receivers, wherein each of said multiple receivers monitors an assigned one of said multiple paging channels at a first assigned one of said time slots within a first slot cycle for receiving traffic pages and a second paging channel, designated as a broadcast message paging channel where broadcast pages and said broadcast messages are transmitted on, at a second time slot within a second slot cycle, and wherein said broadcast message is received on said broadcast message paging channel at a third time slot within said second slot cycle, said apparatus comprising:

page receive controller means for providing a page timing signal indicative of said second time slot within each slot cycle, and for determining in which time slot a broadcast message may be received;

broadcast message controller means for providing a broadcast message timing signal indicative of said third time slot within said second slot cycle;

receiver means for monitoring said broadcast message paging channel in accordance with said page timing signal, for receiving said broadcast page, for monitoring said broadcast message paging channel in accordance with said broadcast message timing signal, and for receiving said broadcast message; and decoder means for decoding said broadcast page and for providing said decoded broadcast page to said page receive controller, wherein said page receive controller is further for determining in accordance with a predetermined set of user preferences, whether to receive said broadcast message.

9. The apparatus of claim 8 wherein:

said page receive controller means is further for providing a new page timing signal indicative of a new page indicator at said first assigned one of said time slots in each slot cycle, and wherein said new page indicator indicates whether or not a new broadcast page is available to be received;

said receiving means is further for receiving said new page indicator; and said decoder means is further for preventing said receiver means from monitoring said one of said assigned paging channels for said broadcast page if said new page indicator indicates that no broadcast page is available to be received.

10. An apparatus for receiving broadcast messages from a transmitter in a communication network, said network having multiple paging channels, wherein each of said multiple paging channels is divided into predetermined slot cycles, wherein each of said predetermined slot cycles is divided into time slots, said network further containing multiple receivers, wherein each of said multiple receivers monitors a first paging channel at each time slot within a first slot cycle and a second paging channel, designated as a broadcast message paging channel where broadcast pages and said broadcast messages are received, at a second time slot within a second slot cycle, and wherein said broadcast message is received on said broadcast message paging channel at a third time slot within either said second slot cycle or a third slot cycle, said apparatus comprising:

page receive controller means for providing a first page timing signal indicative of each time slot within said first slot cycle, for providing a second page timing signal indicative of said second time slot within said second slot cycle, and for providing a broadcast message timing signal indicative of said third time slot within either said second slot cycle or said third slot cycle;

page receiver means for monitoring said first paging channel in accordance with said first page timing signal, for receiving a first broadcast page, for monitoring said broadcast message paging channel in accordance with said second page timing signal, for receiving a second broadcast page, for monitoring said broadcast message paging channel in accordance with said broadcast message timing signal, and for receiving a broadcast message; and decoder means for decoding said first broadcast page, for providing said decoded first broadcast page to said page receive controller, for decoding said second broadcast page, and for providing said decoded second broadcast page to said page receive controller, wherein said page receive controller is further for determining whether said second broadcast page is available to be received on said broadcast message paging channel and for determining in accordance with a predetermined set of user preferences, whether to receive said broadcast message.

11. An apparatus for transmitting broadcast messages to a plurality of receivers in a communications network, said network having multiple paging channels, wherein each of said multiple paging channels is divided into predetermined slot cycles, wherein each of said predetermined slot cycles is divided into time slots, said network further containing multiple receivers, wherein each of said multiple receivers monitors a first paging channel at each time slot within a first slot cycle and a second paging channel, designated as a broadcast message paging channel where broadcast pages and said broadcast messages are transmitted on, at a second time slot within a second slot cycle, and wherein said broadcast message is received on said broadcast message paging channel at a third time slot within either said second slot cycle or a third slot cycle, said apparatus comprising:

page transmit controller means for providing a first page timing signal indicative of all time slots of said first slot cycle, for providing a second page timing signal indicative of a second time slot in a second slot cycle, and for providing a broadcast message timing signal indicative of said third time slot in either said second slot cycle or said third slot cycle;

page buffer means for providing a first broadcast page in accordance with said first page timing signal, wherein said first broadcast page indicates whether or not a second broadcast page is to be transmitted on said second paging channel, and for providing a second broadcast page in accordance with said second page timing signal, wherein said second broadcast page indicates said broadcast message timing information;

message buffer means for providing said broadcast message in accordance with said broadcast message timing signal;

modulator means for providing said first broadcast page upon every paging channel, for providing said second broadcast page on said broadcast message paging channel, and for providing said broadcast message on said broadcast message paging channel; and transmitter means for transmitting said first broadcast page, said second broadcast page, and said broadcast message.

12. The apparatus of claim 11 wherein said second broadcast page comprises:

a broadcast handle which identifies the content of said broadcast message; and a delivery vector which identifies where to receive said broadcast message.

13. The apparatus of claim 12 wherein said broadcast handle comprises:

a source address which identifies the sender of said broadcast message.

14. The apparatus of claim 13 wherein said broadcast handle further comprises:

a function code which indicates the subject matter of the message.

15. The apparatus of claim 14 wherein said broadcast handle further comprises:

a sequence number which identifies the version number of said broadcast message such that each of said plurality of receivers can avoid receiving the same broadcast message twice.

16. The apparatus of claim 15 wherein said broadcast handle further comprises:

a language indicator which indicates which the language in which the message is provided.

17. The apparatus of claim 12 wherein said delivery vector comprises:

a frequency band sub-field which identifies on which frequency sub-band said broadcast message will be transmitted.

18. The apparatus of claim 17 wherein said frequency sub-field is indicated within said second broadcast page.

19. The apparatus of claim 17 wherein said frequency sub-field is determined in accordance with a predetermined calculation format.

20. The apparatus of claim 17 wherein said delivery vector further comprises:

a channel sub-field which identifies on which channel said broadcast message will be transmitted.

21. The apparatus of claim 20 wherein said delivery vector further comprises:

a slot sub-field which identifies in which time slot said broadcast message will be transmitted.

22. The apparatus of claim 21 wherein said slot sub-field is indicated within said second broadcast page.

23. The apparatus of claim 21 wherein said slot sub-field is determined in accordance with a predetermined calculation format.

24. The apparatus of claim 20 wherein said channel sub-field is indicated within said second broadcast page.

25. The apparatus of claim 20 wherein said channel sub-field is determined in accordance with a predetermined calculation format.

* * * * *

UNITED STATES PATENT AND TRADEMARK OFFICE
CERTIFICATE OF CORRECTION

PATENT NO. : 6,157,815
DATED : December 5, 2000
INVENTOR(S) : Collins et al.

It is certified that error appears in the above-identified patent and that said Letters Patent is hereby corrected as shown below:

<u>Column 12,</u>
Line 11, change "he" to -- The --;
Line 23, change "included" to -- includes --.

Signed and Sealed this

Second Day of August, 2005

JON W. DUDAS
*Director of the United States Patent and Trademark Office*